Aug. 16, 1960   G. KERNCHEN   2,949,177
LINE INDICATING AND POSITIONING
ARRANGEMENT FOR TYPEWRITERS
Filed May 20, 1959

INVENTOR
Günter Kernchen
BY
Michael S. Striker
Attorney

United States Patent Office 2,949,177
Patented Aug. 16, 1960

2,949,177

LINE INDICATING AND POSITIONING ARRANGEMENT FOR TYPEWRITERS

Günter Kernchen, Wilhelmshaven, Germany, assignor to Olympia Werke A.G., Wilhelmshaven, Germany Filed May 20, 1959, Ser. No. 814,452

Claims priority, application Germany May 28, 1958

9 Claims. (Cl. 197—187)

The present invention relates to a line and position indicating arrangement for a business machine, such as a typewriter, and more particularly to the line and position indicator which is mounted on the paper guide means of the typewriter and can be adjusted independently of the adjustment of the paper guide means.

Line and position indicating devices according to the prior art have the disadvantage that they form a unit with the front paper guide means, so that the paper guide means must be adjusted for placing a line indicator in proper position. The paper guide means requires an adjustment for the purpose of determining its distance from the platen roll, whereas for the purpose of line and letter indication, an adjustment in two transverse directions is required in addition to the spacing of the paper guide means from the the platen roll. Consequently, the devices of the prior art require an adjustment of a unit in three dimensions, in accordance with the thickness of the paper, in accordance with the position of the line, and in accordance with the positions of the letters within a line. An adjustment in three directions is rather complicated, and may lead to inaccuracies.

It is one object of the present invention to overcome the disadvantages of the line and position indicating devices of the prior art, and to provide a line and position indicator which can be adjusted independently of any adjustment of the paper guide means.

Another object of the present invention is the provision of a line and position indicator which is mounted on the paper guide means for adjustment in two directions, namely in the direction of a line and in a direction transverse thereto.

A further object of the present invention is to provide an adjustable line and position indicator which is detachably mounted on the paper guide means in a manner permitting attachment and removal of the indicator without any tools.

It is also an object of the present invention to provide a line and position indicator adjustment and detachment of which can be carried out by an unskilled person.

With these objects in view, the present invention mainly consists in a line and position indicating arrangement for a business machine, such as a typewriter, the arrangement comprising an indicator member having a graduated edge; first holder means, preferably portions of a paper guide means, operatively connected to the indicating member and being adjustable in a direction transverse to the graduated edge; and second holder means operatively connected to the indicator member and being adjustable in the direction of the graduated edge. By adjustment of the first holder means, the indicator member can be placed in a position in which the graduated edge thereof extends exactly along a typewritten line, and by adjustment of the second holder means, the indicator member is moved in the direction of its graduated edge into a position in which the graduations coincide with the letters of the typewritten line.

In the preferred embodiment of the present invention, the indicator member is made of a transparent material, and the first holder means are a pair of tongues against which an edge of the indicator member slidably abuts. The second holder means are preferably resilient tongues projecting into recesses of the indicator member and resiliently urging the indicator member against the first holder means. The resilient tongues of the second holder means are preferably portions of a slotted plate through which a screw passes into the paper guide means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
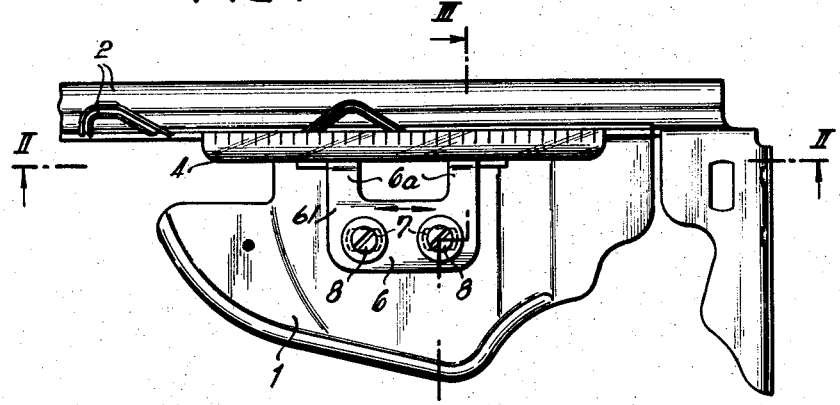
Fig. 1 is a plan view of a line and position indicating arrangement according to the present invention.
Figure 2:
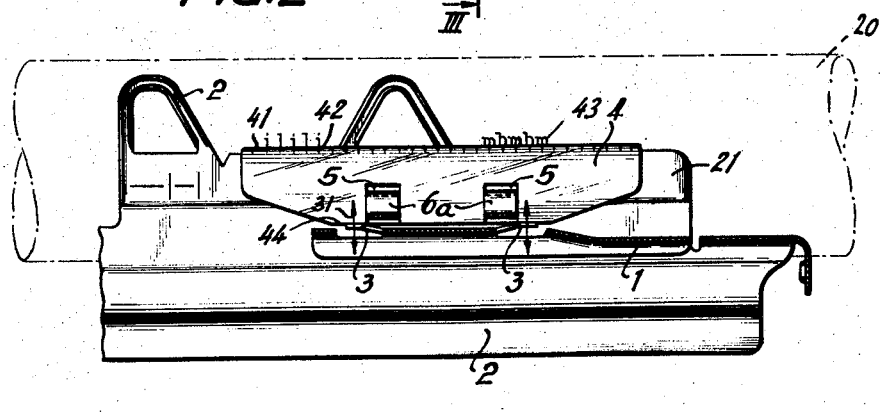
Fig. 2 is a longitudinal sectional view taken on the line II—II in Fig. 1.

A paper guide means 2, which is only partly shown in Figs. 1 and 2, has a paper guiding portion 21 which is suitably spaced from the platen roll 20 to permit passage and guidance of a sheet mounted on the carriage of the typewriter. Integral with the paper guiding portion 21, is the supporting portion 1 of the paper guide means 2. Supporting portion 1 is mounted on the typewriter in a manner permitting adjustment of the distance of the paper guiding portion 21 from the platen roll 20.

The horizontal part of supporting portion 1 has a pair of tongues 3 which are bendable out of the plane of the supporting portion 1 in the direction of the arrows 31.

A line and position indicator member 4 has an indicating edge 41 provided with graduations 42 which are spaced from each other in accordance with the letters of a typewritten line 43.

The indicator member 4 is preferably made of transparent material, and has another edge 44 which abuts on the pair of tongues 3 of the paper guide means 2. The tongues 3 are independently bent and adjusted until the indicating edge 41 extends exactly along a typewritten line 43, and when indicator member 4 slides along tongues 3, the indicating edge 41 is not displaced relative to the line 43, since edge 44 is parallel to the indicating edge 41. Consequently, indicator member 4 can be adjusted in the direction of the indicating edge 41 until the graduations 42 coincide with the letters of the typewritten line 43.

Figure 3:
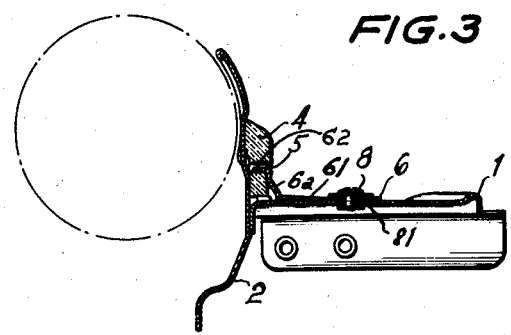
Fig. 3 is a cross sectional view taken on line III—III in Fig. 1.

The supporting portion 1 of the paper guide means 2 has two threaded bores 81 into which two screws 8 are threaded. Screws 8 respectively pass through a pair of slots 7 in the holding plate 61 of a second holding means 6 which has two resilient tongues 6a. The tongues have bent end portions 62 respectively projecting into two recesses or openings 5 in the indicator member 4, as best seen in Figs. 2 and 3. The resilient tongues 6a are adjustable in a direction transverse to the edge 41, and resiliently urge the indicator member 4, or more specifically the edge 44, against the pair of tongues 3.

Since slots 7 are aligned in the direction of the indicating edge 41, the position of the second holder means 6 can be adjusted when screws 8 are loosened, whereby indicator member 4 is shifted in the direction of its indicator edge 41 along the tongues 3. Recesses 5 have a width corresponding to the width of tongues 6a, so that indicator member 4 cannot move relative to the tongues 6a in the direction of the indicating edge 41, so that the position of the graduations 42 relative to the letters of the typewritten line 43 is determined when screws 8 are tightened.

The adjustment of the line and position indicator member 4 is carried out in the following manner. First, tongues 3 are bent up until the graduated indicating edge 41 exactly extends along the typewritten line, and it will be understood that an angular adjustment of edge 41 is also possible, since tongues 3 can be independently bent to different extents. Screws 8 are loosened, and second holding means 6 is shifted together with the indicator member 4, which slides along tongues 3, until the graduations 42 exactly coincide with the centers of the letters of the typewritten line 43. When screws 8 are tightened, the holding plate 61 is pressed against the supporting portion 1 of the paper guide means 2 whereby the resilient tongues 6a are pressed against the walls of the respective recesses 5 to urge the indicator member resiliently against the tongues 3.

It will be understood that each of the elements described above, or two or more together, may also find a useful application in other types of line indicating arrangements differing from the types described above.

While the invention has been illustrated and described as embodied in a line and position indicating arrangement mounted on the paper guide means of a typewriter for adjustment in two transverse directions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Line and position indicating arrangement for a business machine, and comprising, in combination, an indicator member having an edge and graduations along said edge; a paper guide means including two first holder means operatively connected to said indicator members, said first holder means being spaced in the direction of said edge, and each first holder means being adjustable in a direction transverse to said edge for holding said indicator member in a position in which said edge extends exactly along a typewritten line; and second holder means operatively connected to said indicator member and being mounted on said paper guide means for adjustment in the direction of said edge for holding said indicator member in a position in which said graduations are adapted to coincide with the letters of the typewritten line.

2. Line and position indicating arrangement for a business machine, and comprising, in combination, an indicator member having an edge and graduations along said edge; a paper guide means including two first holder means slidably abutting said indicator member and being spaced from each other in the direction of said edge, said two first holder means being independently adjustable in a direction transverse to said edge for holding said indicator member in a position in which said edge extends exactly along a typewritten line; and resilient holder means engaging said indicator member for urging the same against said first holder means, said second holder means being mounted on said paper guide means for adjustment in the direction of said edge for shifting said indicator member along said first holder means and for holding said indicator member in a position in which said graduations are adapted to coincide with the letters of the typewritten line.

3. Line and position indicating arrangement for a typewriter and comprising, in combination, an indicator member having an indicating edge and graduations along said indicating edge, said indicator member having another edge substantially parallel to said indicating edge; a pair of stationary first holder means fixedly mounted on the typewriter and slidably abutting said other edge of said indicator member, said first two holder means being independently adjustable in a direction transverse to said indicating edge for holding said indicator member in a position in which said indicating edge extends exactly along a typewritten line; and second stationary holder means mounted on the typewriter and engaging said indicator member, said second holder means being adjustable in the direction of said edge for holding said indicator member in a position in which said graduations are adapted to coincide with the letters of the typewritten line, and being adjustable in said transverse direction for urging said indicator member against said first two holder means.

4. Line and position indicating arrangement for a typewriter and comprising, in combination, an indicator member having an indicating edge and graduations along said indicating edge, said indicator member having another edge substantially parallel to said indicating edge; a paper guide means including an elongated paper guiding portion, and a supporting portion fixedly secured to the typewriter, said supporting portion having two first tongues slidably abutting said other edge of said indicator member and being independently bendable and adjustable in a direction transverse to said indicating edge for holding said indicator member in a position in which said indicating edge extends exactly along a typewritten line; and second holder means mounted on said paper guide means and including two second tongues engaging said indicator member and being spaced in the direction of said indicating edge, said second holder means being adjustably mounted on said paper guide means for adjustment in the direction of said indicating edge for shifting said indicator member along said first tongues and for holding said indicator member in a position in which said graduations are adapted to coincide with the letters of the typewritten line, and said second tongues being adjustable in said transverse direction for urging said indicator member against said first tongues.

5. Line and position indicating arrangement for a typewriter and comprising, in combination, an indicator member having an indicating edge and graduations along said indicating edge, said indicator member having another edge substantially parallel to said indicating edge; a paper guide means including an elongated paper guiding portion, and a supporting portion fixedly secured to the typewriter, said supporting portion having two first tongues slidably abutting said other edge of said indicator member and being independently bendable and adjustable in a direction transverse to said indicating edge for holding said indicator member in a position in which said indicating edge extends exactly along a typewritten line; and second holder means mounted on said paper guide means and including two second resilient tongues engaging said indicator member and being spaced in the direction of said indicating edge, said second holder means being adjustably mounted on said paper guide means for adjustment in the direction of said indicating edge for shifting said indicator member along said first tongues and for holding said indicator member in a position in which said graduations are adapted to coincide with the letters of the typewritten line, and said second tongues being adjustable in said transverse direction for urging said indicator member against said first tongues.

6. Line and position indicating arrangement for a typewriter and comprising, in combination, an indicator member having an indicating edge and graduations along said indicating edge, said indicator member having another edge substantially parallel to said indicating edge and being formed with a pair of recesses spaced from each other in the direction of said indicating edge; a paper guide means including an elongated paper guiding portion, and a supporting portion fixedly secured to the typewriter, said supporting portion having two first tongues slidably abutting said other edge of said indicator member and being independently bendable and adjustable in a direction transverse to said indicating edge for holding said indicator member in a position in which said indicating edge extends exactly along a typewritten line; and second holder means mounted on said paper guide means and including two second resilient tongues spaced in the direction of said indicating edge and projecting into said recesses of said indicator member for urging the same against said first tongues, said second holder means being adjustably mounted on said paper guide means for adjustment in the direction of said indicating edge for shifting said indicator member along said first tongues and for holding said indicator member in a position in which said graduations are adapted to coincide with the letters of the typewritten line.

7. Line and position indicating arrangement for a typewriter and comprising, in combination, an indicator member having an indicating edge and graduations along said indicating edge, said indicator member having another edge substantially parallel to said indicating edge and being formed with a pair of recesses spaced from each other in the direction of said indicating edge; a paper guide means including an elongated paper guiding portion, and a supporting portion fixedly secured to the typewriter, said supporting portion having two first tongues slidably abutting said other edge of said indicator member and being independently bendable and adjustable in a direction transverse to said indicating edge for holding said indicator member in a position in which said indicating edge extends exactly along a typewritten line; second holder means including a holder plate having at least one slot, and a pair of second resilient tongues projecting into said recesses of said indicator member for urging the same against said first tongues; and screw means passing through said slot and being threaded into said paper guide means for securing said second holder means to said paper guide means, said slot in said holder plate permitting adjustment of said second holder means with said indicator member in the direction of said indicating edge for holding said indicator member in a position in which said graduations are adapted to coincide with the letters of the typewritten line.

8. Line and position indicating arrangement for a typewriter and comprising, in combination, an indicator member having an indicating edge and graduations along said indicating edge, said indicator member having another edge substantially parallel to said indicating edge and being formed with a pair of recesses spaced from each other in the direction of said indicating edge; a paper guide means including an elongated paper guiding portion, and a supporting portion fixedly secured to the typewriter, said supporting portion having two first tongues slidably abutting said other edge of said indicator member and being independently bendable and adjustable in a direction transverse to said indicating edge for holding said indicator member in a position in which said indicating edge extends exactly along a typewritten line; second holder means including a holder plate having at least one slot, and a pair of second resilient tongues each having a first portion transversely projecting from said holder plate, and a second bent portion projecting into said recesses of said indicator member for urging the same against said first tongues, said second bent portions having in the direction of said indicating edge the same width as said recesses; and screw means passing through said slot and being threaded into said paper guide means, said slot in said holder plate permitting adjustment of said second holder means with said indicator member in the direction of said indicating edge for holding said indicator member in a position in which said graduations are adapted to coincide with the letters of the typewritten line.

9. An arrangement as set forth in claim 8 wherein said holder plate has two slots aligned in the direction of said indicating edge; and wherein said screw means include two screws respectively passing through said slots into said paper guide means.

References Cited in the file of this patent

UNITED STATES PATENTS

| | | |
|---|---|---|
| 580,953 | Price | Apr. 20, 1897 |
| 922,547 | Vincent | May 25, 1909 |
| 1,574,298 | Lindburg | Feb. 23, 1926 |